United States Patent
Gertig

(10) Patent No.: US 8,776,348 B2
(45) Date of Patent: Jul. 15, 2014

(54) METHOD FOR THE PRODUCTION OF AN EXTERIOR DOOR HANDLE

(75) Inventor: Frank Gertig, Bergisch Gladbach (DE)

(73) Assignee: Huf Hulsbeck & Furst GmbH & Co. KG (DE)

( * ) Notice: Subject to any disclaimer, the term of this patent is extended or adjusted under 35 U.S.C. 154(b) by 1250 days.

(21) Appl. No.: 12/599,017

(22) PCT Filed: Apr. 30, 2008

(86) PCT No.: PCT/EP2008/055330
§ 371 (c)(1),
(2), (4) Date: Nov. 5, 2009

(87) PCT Pub. No.: WO2008/135491
PCT Pub. Date: Nov. 13, 2008

(65) Prior Publication Data
US 2010/0132162 A1 Jun. 3, 2010

(30) Foreign Application Priority Data
May 8, 2007 (EP) .................................... 07107690

(51) Int. Cl.
*B23P 25/00* (2006.01)
(52) U.S. Cl.
USPC ........... 29/458; 29/897.2; 29/527.2; 296/1.02
(58) Field of Classification Search
USPC ........ 29/897.2, 458, 527.1, 527.2; 296/146.1, 296/146.4, 146.5, 1.02
See application file for complete search history.

(56) References Cited

U.S. PATENT DOCUMENTS

| | | | | |
|---|---|---|---|---|
| 3,117,053 A * | 1/1964 | Lawrence et al. | .......... | 428/195.1 |
| 3,421,967 A * | 1/1969 | Hochner | .................... | 428/211.1 |
| 4,882,842 A * | 11/1989 | Basson et al. | ................... | 29/857 |
| 5,427,822 A * | 6/1995 | Bracciano | ..................... | 427/424 |
| 6,304,168 B1 * | 10/2001 | Ohta et al. | ..................... | 340/5.72 |
| 6,678,936 B2 * | 1/2004 | Izumi et al. | ..................... | 29/460 |
| 7,632,445 B2 * | 12/2009 | Porter et al. | .................. | 264/241 |
| 7,635,210 B2 * | 12/2009 | Metros et al. | ................. | 362/501 |
| 2004/0227374 A1 * | 11/2004 | Hirota et al. | ............... | 296/146.1 |

(Continued)

FOREIGN PATENT DOCUMENTS

| | | |
|---|---|---|
| DE | 19935290 | 2/2001 |
| DE | 102005022791 | 11/2006 |

(Continued)

OTHER PUBLICATIONS

International Search Report; PCT/EP2008/055330; Aug. 14, 2008.

*Primary Examiner* — David Bryant
*Assistant Examiner* — Christopher M Koehler
(74) *Attorney, Agent, or Firm* — Cantor Colburn LLP

(57) ABSTRACT

The invention relates to a method for the production of an exterior door handle (100) for a motor vehicle, wherein the method comprises the following steps: (a) injection molding (10) of at least one first mold part (150) and one second mold part (151) using a plastic mass; (b) building (20) the exterior door handle (100) from the at least two mold parts (150, 151); c) painting (30) a surface of the exterior door handle (100); (d) disassembling (40) the exterior door handle (100) into the at least two mold parts (150, 151); (e) installing (50) an electronic unit in at least one of the two mold parts (150, 151); (f) assembling (60) the at least two mold parts (150, 151) and the electronic unit to form the exterior door handle (100).

12 Claims, 2 Drawing Sheets

(56) References Cited

U.S. PATENT DOCUMENTS

| | | | |
|---|---|---|---|
| 2005/0073804 A1* | 4/2005 | Maruyama et al. | 361/600 |
| 2005/0121829 A1* | 6/2005 | Spurr et al. | 264/272.11 |
| 2005/0230867 A1* | 10/2005 | Aisenbrey | 264/104 |
| 2006/0068206 A1* | 3/2006 | Hala et al. | 428/411.1 |
| 2006/0121282 A1* | 6/2006 | Pfeiffer et al. | 428/411.1 |
| 2007/0115191 A1* | 5/2007 | Hashiguchi et al. | 343/713 |
| 2007/0182166 A1* | 8/2007 | Schindler et al. | 292/336.3 |
| 2007/0246967 A1* | 10/2007 | Lynam et al. | 296/146.1 |
| 2008/0068857 A1* | 3/2008 | Meinke et al. | 362/546 |
| 2008/0164635 A1* | 7/2008 | Werner | 264/255 |
| 2008/0217942 A1* | 9/2008 | Lang | 296/1.02 |
| 2009/0257241 A1* | 10/2009 | Meinke et al. | 362/546 |
| 2009/0302627 A1* | 12/2009 | Onuma et al. | 296/1.08 |
| 2010/0213736 A1* | 8/2010 | Lynam et al. | 296/146.1 |

FOREIGN PATENT DOCUMENTS

| | | |
|---|---|---|
| DE | 102005046119 A1 | 3/2007 |
| FR | 2819538 | 7/2002 |
| WO | 03050371 A | 6/2003 |

\* cited by examiner

METHOD FOR THE PRODUCTION OF AN EXTERIOR DOOR HANDLE

TECHNICAL FIELD OF THE INVENTION

The invention concerns a process for producing an outer door handle for motor vehicles.

BRIEF SUMMARY OF RELATED ART

Known outer door handles for motor vehicles are used to mechanically shift the lock of a locking device. Such kinds of locking devices are built into motor vehicles and provide for the power and/or keyed locking of an outer door of a motor vehicle. Outer door handles of the type generally described consist of several component parts. In the scope of current production processes, an electronic unit is integrated into these component parts, which is part of the locking device of the motor vehicle. The as-yet externally untreated outer door handle materializes by assembling the component parts as well as the electronic unit.

The surface of the outer door handle is varnished to treat the outer structure. It has proved to be disadvantageous since the varnish particles can come in contact with the electronic unit already built-in. Short circuits or other kinds of damage that occur in this way can lead to the partial or complete destruction of the electronic unit. To achieve a consistent standard of quality, the manufacturer is therefore obliged to test the electronic unit after it has been installed. Possible damages can no longer be repaired, as the electronic unit can only be removed at great expense.

BRIEF SUMMARY OF THE INVENTION

The invention discloses a process for producing an outer door handle for motor vehicles in which the above-mentioned disadvantages are avoided, particularly that no damage to the electronic unit occurs during varnishing.

According to the invention, a process is provided for producing an outer door handle for motor vehicles, which has the following steps:
(a) injection molding of at least a first and a second component part with a plastic mixture;
(b) construction of the outer door handle from the at-least-two molded parts;
(c) varnishing a surface of the outer door handle;
(d) dismantling the outer door handle into the at-least-two molded parts;
(e) installing an electronic unit in at least one of the two molded parts;
(f) assembling the at-least-two molded parts and the electronic unit for the outer door handle.

In the scope of the process of the invention it is therefore provided first to manufacture the molded parts from a plastic mixture. From the molded parts thus produced, the outer door handle can be constructed, which does not yet have a processed surface. This takes place in the next step of the process, in which the surface of the outer door handle is varnished. The term surface primarily denotes that part of the outer door handle that the user will see and/or potentially touch. Thus, in the meaning of the invention, the surface does not necessarily comprise the entire outer surface of the outer door handle. After varnishing, the outer door handle is again dismantled into the molded parts. Only after this is the electronic unit integrated into one or more of the molded parts. Installing the electronic unit after varnishing the outer door handle prevents varnish particles from coming into contact with the electronic unit. At the time of installation, it is ensured that the varnish on the surface of the outer door handle is dried and hardened. After the integration of the electronic unit into at least one of the molded parts, the outer door handle is put together again. In the scope of the process of the invention, it is possible to check the electronic unit for possible errors during the manufacture. Further inspection after the integration into the outer door handle, as has been necessary up to now, is made superfluous by the method of the invention. In addition, a clear reduction in manufacturing time for the outer door handle is achieved by the method of the invention. Separate varnishing of the surface of the entire outer door handle and subsequent installation of the electronic unit leads to a significant shortening of the production run time for outer door handles for motor vehicles.

An advantageous embodiment of the process for producing an outer door handle according to the invention is distinguished in that Step (a) has at least the following steps:
(i) introduction of a quantity of the molten plastic mixture into a first and a second mold in order to essentially fill the first and second molds;
(ii) introduction of gas under pressure or fluid under pressure into the plastic mixture in the first and second molds;
(iii) allowing the plastic mixture to solidify in the first and second molds;
(iv) expelling the gas or fluid out of the molds;
(v) removing the first and second molded parts from the molds.

Within the scope of Step (i) a plastic mixture—for instance a synthetic resin material—is injected into the molds in a molten state with the help of an injection molding machine. The plastic is then pressure impacted with the help of the injection molding machine for a prescribed short length of time, for example 1 to 30 seconds. This aids a good reproducibility of the surfaces of the molded parts thus produced. The gas or fluid forced into the mold ensures that a hollow space is created in the molten plastic mixture and is pressed against the inner surface of the molds. By maintaining the internal pressure, the plastic mixture solidifies on an outer layer while a core section of the plastic mixture remains molten. This results in a good surface quality of the molded parts thus produced. The pressure medium is then partially released from the mold by an outlet of the injection molding machine. The remaining "retention" or "compression" pressure of the gas/fluid in the mold remains, while the remaining plastic mixture cools off and solidifies. The time required for this lies on the order of 10 to 50 seconds or more, according to the size or thickness of the poured molded parts. After the aeration or expulsion of the gas from the mold, the mold is opened and the ready molded part is ejected or removed. Any leftover plastic remainders can be removed, crushed and used again. By the described sequence of Step (a) of the process of the invention, consistent quality in the production of molded parts and thus of the outer door handle, is guaranteed.

A further advantageous embodiment of the process of the invention is characterized in that Step (a) is constituted so that a liquid color element is introduced into the plastic mixture, wherein the plastic mixture and the liquid color element are mixed such that a homogenized spill mixture is formed, which is sprayed into the first and/or the second mold, whereby the consistently colored first and/or second parts are manufactured.

According to the invention, the liquid color element is supplied exclusively before injection of the plastic mixture, which is formed by a multitude of plastic granules, into the mold. Then the plasticized plastic mixture and the liquid color element are mixed inside the injection molding machine such that a homogenized spill mixture is formed, which is injected into the mold, whereby a consistently colored molded part is manufactured. The spill mixture is mixed inside the injection molding machine in such a way that the spill mixture has a high degree of homogeneity when it enters the mold. The resulting molded parts have a pleasing appearance, wherein any damages, such as scratches, etc., do not occur, as the molded part is colored through in its cross section. With the above-described advantageous embodiment of the Step (a) of the invention, the outer door handle need only be covered with a clear varnish in the scope of Step (c). By introducing the liquid color element when injecting the spill mixture into the molds, it is guaranteed that the molded parts have the desired outer color. Thus, only an additional outer varnish to protect the color of the outer door handle is needed to complete the outer door handle.

In a particular embodiment of the invention the mold has a polished surface, wherein a colored molded part is obtainable by the injection molding method of the invention, with the surface of said molded part being highly polished as well. Preferably, the surface of the mold is polished in several working steps, and in the final state has a surface roughness that tends toward zero.

Advantageously, the plastic granules that are introduced into the injection molding machine are transparent or partly transparent, by which, in combination with the liquid color element, molded parts with high color brilliance are unexpectedly obtained. The liquid color element can, for example, be mixed with the plastic granules, wherein these are then introduced together into the injection molding machine through the entry area. A final mixing then takes place inside the injection molding machine. It is also advantageous if the liquid color element is conducted directly into the injection molding machine in which the plastic granules are plasticized.

As material of the plastic mixture for the molded part, all plastics that are injection moldable can be used. Preferably, as plastic granules, polyamides (PA), polycarbonates (PC), acrylonitrile-butadiene-styrene copolymers (ABS), polymethyl methacrylates (PMMA) or acrylonitrile-styrene-acrylester copolymers (ASA) can be used.

In a preferred embodiment of the process of the invention the liquid color element is fed to an entry area of the mold of the plastic mixture. By this, a satisfactorily thorough mixing of the spill mixture is guaranteed before the evenly distributed spill mixture is injected into the injection molding tool. Advantageously, the injection molding machine is heated so that the entry area has a temperature between 20° C. and 80° C., preferably between 30° C. and 70° C., and most preferably between 40° C. and 60° C. A filling funnel can be arranged at the entry area by which the plastic granulate is fed into the injection molding machine. By the corresponding tempering of the entry area, a good trickling capability of the plastic granulate can be achieved. The liquid color element can likewise be introduced into the injection molding machine through the filling funnel. In this case it is conceivable to feed the color element to the plastic mixture, found inside the injection molding machine, with a flexible hose.

Further, the liquid color element can advantageously be supplied to the plastic mixture in drops. Here, the color element can be a concentrate that is added to the plastic mixture inside the injection molding machine. Advantageously, the liquid color element is added continuously to the plastic mixture. In a preferred alternative embodiment, the liquid color element has a volume percent in the plasticized plastic mixture of less than 5%, preferably less than 2%, more preferably less than 1% and most preferably less than 0.5%. The above-mentioned volume percent is completely sufficient to produce molded parts with the appropriate color.

Functionally, the slip mixture, that is, the plasticized plastic mixture with the liquid color element, has a pressure inside the mold of 300 bar to 700 bar. In this connection, the slip mixture evenly distributed in the injection molding machine is injected into the mold at a pressure of ca. 400 bar to 2,000 bar. Under high pressure, a very even integration of the color element results, so that the surfaces of the finished molded parts receive a consistent color distribution. Any scratches or damage to the surface of the molded parts are not noticeable to a viewer, to the greatest extent possible, since the molded part is colored through consistently along its cross section.

A further advantageous embodiment of the process of the invention is characterized in that the plastic mixture has glass fibers and/or carbon fibers and/or aramide fibers. The use of the above-mentioned fibers results in molded parts with increased stability. It is therefore possible to use less plastic mixture for the production of the outer door handle. This is particularly important for the reduction of the total mass of the motor vehicle, which results in a reduction in the use of fuel. In addition, glass fiber-reinforced plastics have a continuous fragmentation during application of a force. This results in an optimal energy reduction and thus in increased protection of the passengers of the motor vehicle in an accident.

In order that an outer door handle can be made from the molded parts, these parts have a locking and/or anti-locking means in a further advantageous arrangement. If the molded parts will be fitted together according to the process steps of the invention, the locking and anti-locking means are connected in a positive or non-positive fashion. Thereby, the individual molded parts form the entire body of the outer door handle.

Suitably for this advantageous embodiment, locking means can be molded on one of the molded parts and can engage into the anti-locking means of the coordinating molded part. Advantageously, the locking means are clip-connections that result in a positive and non-positive connection due to the light flexibility of the plastic.

Since it is provided in the scope of the process of the invention to fit together the molded parts, varnish the outer door handle thus formed, and then dismantle it again, a further advantageous embodiment of the process of the invention is characterized in that Step (b) has at least the following steps:
(i) placement of at least one coupling clasp in the locking and/or anti-locking means of the first and/or second molded part;
(ii) contour-assembly of the at least two molded parts;
(iii) the locking and anti-locking means of the molded parts taking hold of each other;
(iv) preventing a non-positive and/or positive connection of the locking and anti-locking means of the molded parts by the coupling clasp.

The coupling clasp according to the invention thus prevents the locking and anti-locking means from locking into each other. Consequently a simple dismantling according to Step (d) of the outer door handle into its component parts is possible after varnishing according to step (c). The coupling clasp can be a sheet-type element, for example, which is placed in one of the locking or anti-locking means. Advantageously, the coupling clasp has a hardness that is less than that of the molded parts or the locking or anti-locking means, in order thus to prevent damage to the outer surface.

A further advantageous variant of the process according to the invention is characterized in that Step (c) has at least the following steps:

(i) coating the outer door handle with an adhesive;
(ii) introduction of the outer door handle and a glossy foil into a pressurized mold tool;
(iii) heating the glossy foil to or beyond a gas temperature of a polymeric component of the glossy foil;
(iv) mounting the glossy foil on the surface of the outer door handle;
(v) pressing the glossy foil by gas pressure in the pressurized mold tool;
(vi) thermally hardening the adhesive.

The above-described process according to the invention enables one to apply a cover-varnish layer covering the surface of the outer door handle in a single coating process. In particular, no smoothing preparation of the surfaces of the molded parts is necessary. Further, the surface or varnish layer thus produced is not polished. In this, under the concept "cover-varnish layer" the entire varnish system that covers the surface of the molded part is understood, in particular, it can refer to several varnish layers of different functions. The process according to the invention provides that the outer surface of the outer door handle is coated with an adhesive. For this, the usual adhesives can be used, such as polyurethane-based adhesives in particular, which are preferably thermally hardened. Preferably, the adhesive is applied in a thickness that lies under or near the rough depth of the molded part's surface. Thus the adhesive is prevented from filling completely the depressions in the rough surface. The glossy foil is then placed in the pressurized mold tool and applied over the outer door handle. The glossy foil is then heated in order to attain favorable flexibility and malleability. After that, the glossy surface is mounted on the surface of the part. In order to obtain a smooth surface of the glossy foil, this should be fixed with a light tensile stress. The subsequent hardening of the adhesive is preferably carried out thermally. The hardening temperature should be adjusted to a value that is below the gas or softening temperature of the polymeric components of the glossy foil.

A further advantageous variant of the process according to the invention is characterized in that Step (c) has at least the following steps:
(i) a filler coating is applied to the first and second molded parts;
(ii) the filler coating contains a binder;
(iii) the binder is hardened by energy-rich radiation, particularly by UV-radiation;
(iv) then, a cover coating is applied.

The filling coating of the invention can be cured by means of energy-rich radiation by radical and/or cationic polymerization. As binders that can be hardened by energy-rich radiation, binders that can be cross-linked by radical or cationic polymerization, in particular, can be used. With the former, radicals emerge through the effect of energy-rich radiation on the photo-initiators, which then trigger the cross-linking reaction. In contrast, Lewis-acids are formed in the cationic hardening systems by radiation from initiators, which acids then trigger the cross-linking reaction. The radically hardening binders can be prepolymers, such as polymers or oligomers that have polymerizable olefinic double bonds in the molecule, for example. As binders for cationic polymerizable systems, polyfunctional epoxy oligomers that contain more than two epoxy groups in the molecule can be used, for example.

For the radiation, UV-radiation sources, preferably with emissions in the wavelength range of 150 to 440 nm, particularly from 200 to 400 nm, are used. For this, especially doped high, medium and low pressure mercury lamps, gas-filled tubes, such as low pressure xenon lamps, for example, pulsed and non-pulsed UV-lasers, UV-spotlights, such as UV-emitting diodes and black light tubes have proven advantageous. In order to achieve a homogeneous hardening of the cover coating, an illumination strength of at least 15 megalux, preferably 20 to 80 megalux, must be generated on the surface of coating to be hardened. After the partial or complete hardening of the filler layer, in the process of the invention, a cover coating of a color and/or effect-producing basic varnish layer and a transparent clear varnish layer or a cover coating of a pigmented one-layer cover varnish can be applied.

With the process of the invention, multi-layer coatings with high hardness, high scratch resistance and very good chemical and water resistance may be produced. The individual varnish layers show a very good inter-coating adhesion and resistance to dissolution against the varnish layers lying above or below.

A further advantageous variant of the process according to the invention is characterized in that Step (e) has at least the following steps:
(i) the electronic unit is placed on a support element and arranged on a molded part via the support element;
(ii) a coupling member connects the support element to the molded part in a positive and/or non-positive fashion.

The support element can be, for example, a board (PCB, Printed Circuit Board) on which the electronic chips of the electronic unit as well as the interconnecting wires are arranged. Depending upon the purpose for which it will be used, the insulating base material of the board can be made flexible or stiff. To allow the support element to be mounted on one or more of the molded parts, the coupling member can be designed as a clip element, which cooperates with an opposite element in the molded part in a non-positive and/or positive manner. It is also conceivable for the support to have holes through which screws can be introduced, producing a connection with the molded part.

In the scope of a further advantageous embodiment of the process of the invention, a spill mixture is poured media-densely over the electronic unit before installation according to Step (e). As the spill mixture, a synthetic plastic resin which completely envelops the electronic unit is particularly well suited. The plastic resin can be polyester resin, polyurethane resin, eboxide[1] resin, silicon resin and/or vinyl ester resin, for example. The above-mentioned resins have good media density and therefore prevent environmental influences, such as moisture, from penetrating into the electronic unit. According to the process of the invention, the electronic unit is integrated only after the outer door handle has been varnished. It is consequently recommended to subject the electronic unit first to a functional inspection, and thereafter to pour it with the spill mixture, followed by integrating it into the outer door handle. However, if the latter will be installed in a motor vehicle that will be exposed to particularly severe environmental influences, the electronic unit can alternatively be poured with the spill mixture following the assembly of the at least two molded parts according to Step (f). The spill mixture will then completely fill an inside region of the outer door handle.

[1] Translator's Note: Source error. The term "eboxide resin" is most likely a typo for "epoxide resin". The translation reflects the original German error.

BRIEF DESCRIPTION OF THE DRAWINGS

Further advantages, features and details of the invention are shown by the following description, in which several possible exemplary embodiments of the invention are described in detail with reference to the drawings. In this, the features mentioned in the claims and in the description can be respectively essential to the invention individually or in any combination. The drawings are:

DETAILED DESCRIPTION OF THE INVENTION

Figure 1:
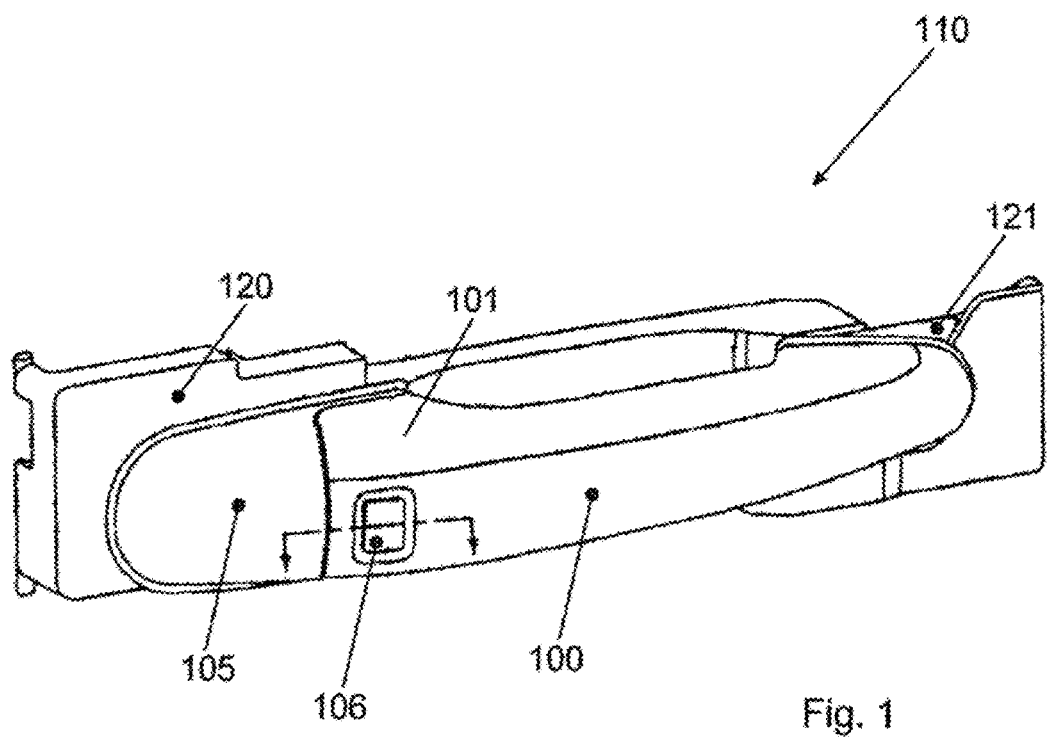
FIG. 1, a schematic representation of an outer door handle for a motor vehicle and FIG. 2, a flowchart of the process according to the invention.

In FIG. 1 an outer door handle system 110 is represented. The outer door handle system 110 has a base element 120 and an outer door handle 100. The base element 120 is integrated into a door (not represented) of a motor vehicle. Generally, the base element 120 is fixed to an inner panel of the outer door via an adhesive or screw connection. The outer door handle 100 is rotatably mounted on a lower end 121 of the base element 120. It is thereby possible for a user to pull the outer door handle 100 out of the plane of the drawing, and thus unlock a locking device (not represented). For aesthetic reasons, a forward end 101 of the outer door handle 100 is closed off by a cover case 105. The cover case 105 is also connected to the base element 120. An electronic unit is arranged inside the outer door handle 100 and can be activated via a switch element 106. In the embodiment represented in the example the switch element 106 is arranged on a surface of the outer door handle 100. Switch elements 106 of this type can serve, for example, to allow wireless communication with an electronic key (not represented). Through the exchange of a code and a subsequent positive evaluation by the electronic unit, a motor vehicle can be locked and/or unlocked by remote control.

Figure 2:
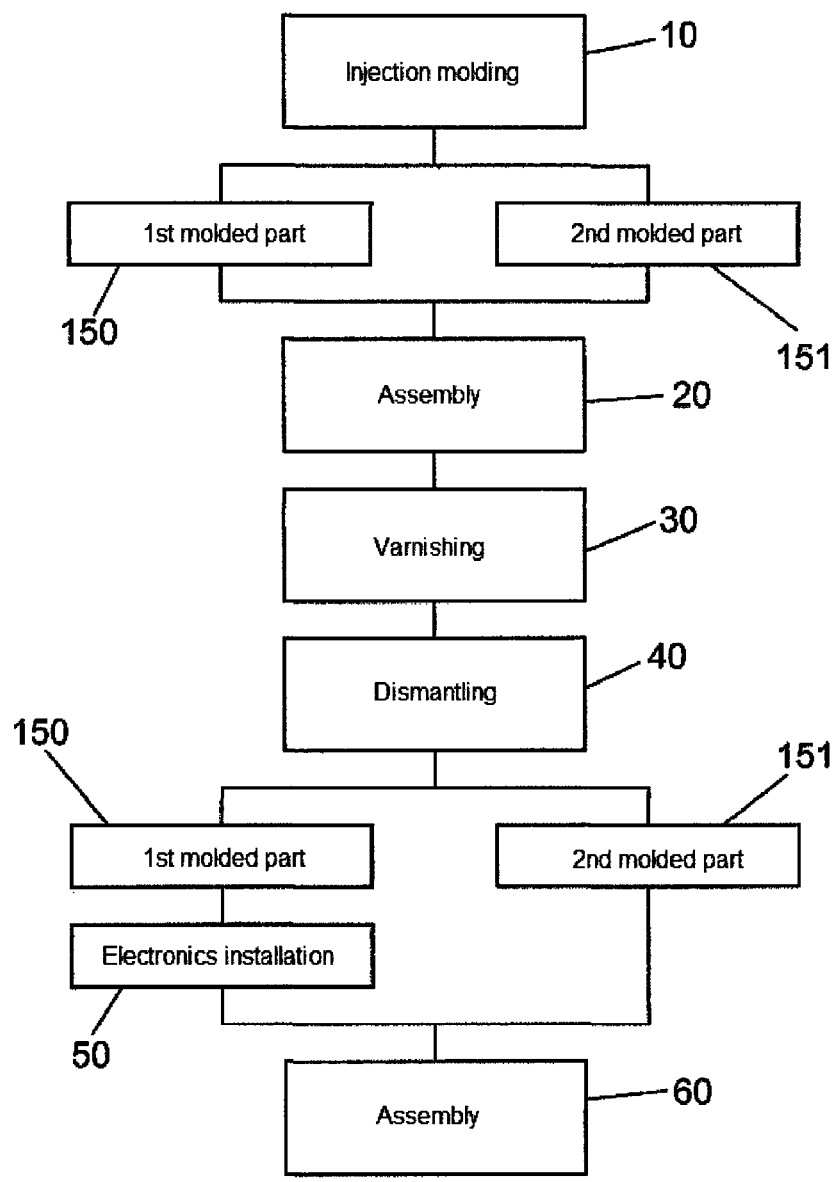

In FIG. 2, a flowchart illustrating the process according to the invention is represented. In a first step, a first molded part 150 and a second molded part 151 are prepared by injection molding 10. For this, a quantity of molten plastic mixture is introduced into a plurality of molds in order essentially to fill these. The plastic mixture is then pressed against the interior surfaces of the mold by introducing gas under pressure. After a solidification and expulsion of the gas, the first 150 and second 151 molded parts, thereby produced, can be removed from the mold.

Due to the high quality with which the surfaces of the molded parts 150, 151 can be produced within the scope of the process of the invention, generally no reworking of the outer or side regions is necessary. Rather, fitting together 20 the molded parts 150, 151 is possible in order to form the outer door handle 100. According to the invention, varnishing 30 follows the fitting together 20 of the molded parts 150, 151. Because at this point the electronic unit still has not been placed in the molded parts 150, 151, it cannot be damaged by varnishing 30. In the scope of the varnishing 30, the surface of the outer door handle 100 is covered with a varnish in order to protect the outer door handle 100 from environmental influences, while at the same time meeting the aesthetic expectations for the motor vehicle.

After the varnishing 30 of the surface of outer door handle 100, the outer door handle 100 is dismantled 40 into the molded parts 150, 151. To facilitate installation 50, the electronic unit is placed on a support element and can be connected to the molded part via a coupling member in a positive and/or non-positive connection. Clip-type coupling members have proven more advantageous.

After the electronic unit is connected with the molded parts 150, 151, the latter two parts can be assembled 60. To guarantee a durable connection, the two molded parts 150, 151 have locking and/or anti-locking means which produce a non-positive and/or positive connection. Because the outer door handle 100 in the scope of the process of the invention is first varnished 30 and then equipped 50 with the electronic unit, it is ensured that no damage to the electronic unit occurs from varnish residues, and consequently the error rate during production is clearly reduced. In addition, a clear reduction in manufacturing time of the outer door handle is achieved by the method of the invention.

The invention claimed is:

1. A process for producing an outer door handle for motor vehicles, comprising the following steps:
    (a) injection molding of at least a first component part and a second component part with a plastic mixture;
    (b) construction of the outer door handle from the at least two molded parts;
    (c) varnishing a surface of the outer door handle;
    (d) dismantling the outer door handle into the at least two molded parts;
    (e) installing an electronic unit in at least one of the two molded parts;
    (f) assembly of the at least two molded parts and the electronic unit to form the outer door handle, wherein step (a) is embodied such that a liquid color element is introduced in the plastic mixture, wherein the plastic mixture and the liquid color element are mixed such that a homogenized spill mixture is formed, which is sprayed into the first and/or the second mold, whereby the consistently colored first and/or second component parts are manufactured, wherein the plastic mixture with the liquid color element has a pressure inside the mold of 300 bar to 700 bar.

2. The process for producing an outer door handle according to claim 1, wherein Step (a) has at least the following steps:
    (i) introduction of a quantity of the molten plastic mixture into a first and a second mold cavity in order to essentially fill the first and second mold cavities;
    (ii) introduction of gas under pressure or a fluid under pressure into the plastic mixture in the first and second mold cavities;
    (iii) allowing the plastic mixture to solidify in the first and second mold cavities;
    (iv) expelling the gas or fluid out of the mold cavities;
    (v) removing the first and second molded parts from the molds.

3. The process of claim 1, wherein the plastic mixture has glass fibers and/or carbon fibers and/or aramide fibers.

4. The process of claim 1, wherein the first and the second molded parts have a locking and/or anti-locking means, which are connected with each other in a non-positive and/or positive connection, in order to from the outer door handle.

5. The process of claim 4, wherein Step (b) has at least the following steps:
    (i) placement of at least one coupling clasp in the locking and/or anti-locking means of the first and/or second molded part;
    (ii) contour assembly of the at least two molded parts;
    (iii) engagement of the locking and anti-locking means of the molded parts, with one another;
    (iv) prevention of a non-positive and/or positive connection of the locking and anti-locking means of the molded parts, by the coupling clasp.

6. The process of claim 1, wherein Step (c) has at least the following steps:
    (i) coating the outer door handle with an adhesive;
    (ii) placement of the outer door handle and a glossy foil into a pressurized mold tool;

(iii) heating of the glossy foil up to and beyond a gas temperature of a polymeric component of the glossy foil;
(iv) mounting the glossy foil on the surface of the outer door handle;
(v) pressing the glossy foil by gas pressure into the pressurized mold tool;
(vi) thermal hardening of the adhesive.

7. The process of claim 1, wherein Step (c) has at least the following steps:
(i) a filler coating is applied to the first and second molded parts;
(ii) the filler coating contains a binder;
(iii) the binder is hardened by energy-rich radiation comprising UV-radiation;
(iv) and then a cover coating is applied.

8. The process of claim 7, wherein the covering layer is comprised of a color and/or effect-producing base varnish layer and a transparent clear varnish layer, or a pigmented one-layer cover varnish.

9. The process of claim 1, wherein Step (e) has at least the following steps:
(i) the electronic unit is placed on a support element and is arranged on a molded part, via said support element;
(ii) a coupling member of the support element is connected in a positive and/or non-positive manner to the molded part.

10. The process of claim 1, wherein a spill mixture is poured media-densely over the electronic unit before the installation according to Step (e).

11. The process of one of claim 1, wherein after the assembly of the at least two molded parts, according to Step (f), the spill mixture is poured over the electronic unit, wherein the spill mixture completely fills an inner area of the outer door handle.

12. A process for producing an outer door handle for motor vehicles, comprising the following steps:
(a) injection molding of at least a first component part and a second component part with a plastic mixture;
(b) construction of the outer door handle from the at least two molded parts;
(c) varnishing a surface of the outer door handle;
(d) dismantling the outer door handle into the at least two molded parts;
(e) installing an electronic unit in at least one of the two molded parts;
(f) assembly of the at least two molded parts and the electronic unit to form the outer door handle, wherein the plastic mixture is formed from a multitude of plastic granules, and wherein the plastic granules are transparent or partly transparent, and wherein PC, PMMA, ABS or PA is used as material for the plastic granules.

* * * * *